United States Patent [19]

Yasukawa et al.

[11] Patent Number: 4,807,085
[45] Date of Patent: Feb. 21, 1989

[54] NONLINEAR CAPACITOR FOR GENERATING HIGH-VOLTAGE PULSES

[75] Inventors: Minoru Yasukawa, Saitama; Takenobu Iida, Urawa, both of Japan

[73] Assignee: Iwasaki Electric Co., Ltd., Tokyo, Japan

[21] Appl. No.: 196,391

[22] Filed: May 20, 1988

[30] Foreign Application Priority Data

May 28, 1987 [JP] Japan ................ 62-129746
May 28, 1987 [JP] Japan ................ 62-129747

[51] Int. Cl.$^4$ ........................... H01G 1/13
[52] U.S. Cl. ........................... 361/321
[58] Field of Search ........... 361/306, 320, 321

[56] References Cited

U.S. PATENT DOCUMENTS

| 2,509,758 | 5/1950 | Brockman | 361/321 |
| 3,745,431 | 7/1973 | Imamura et al. | 361/321 |
| 4,654,749 | 3/1987 | Kanai | 361/321 |

Primary Examiner—Donald A. Griffin
Attorney, Agent, or Firm—Armstrong, Nikaido, Marmelstein & Kobovcik

[57] ABSTRACT

A nonlinear capacitor for generating high-voltage pulses comprises a ferroelectric substrate, electrode layers formed on both sides of said substrate, a mineral glass coating covering the entire surface of the capacitor except for the connector portions for said electrode layers and for the outer peripheral surface of said ferroelectric ceramic substrate, and lead terminals electrically connected to the electrode layers through said connector portions.

This construction prevents the mechanical oscillation due to electrostriction from being restrained, thereby permitting the capacitor to generate high-voltage pulses of great amplitude and energy.

15 Claims, 4 Drawing Sheets 4,807,085

NONLINEAR CAPACITOR FOR GENERATING HIGH-VOLTAGE PULSES

BACKGROUND OF THE INVENTION

This invention relates to an improvement in a nonlinear capacitor for generating high-voltage pulses, used, for example, in the contactless starter of a gas-discharge lamp.

Ferroelectric ceramic capacitors (hereinafter referred to as FEC capacitors) made mainly from barium titanate have found various applications as circuit elements. Since their nonlinear voltage charge characteristics enable them to function as high-speed electronic switches, FEC capacitors are also used nowadays as the switching elements in the contactless starter of gas discharge lamps, as disclosed, for example, in Japanese Patent Publication No. 48-28726.

An FEC capacitor utilized as a switching element in a contactless starter for a gas discharge lamp is generally constructed as follows: as shown in FIG. 1, both sides of a sintered body 1 of barium titanate ($BaTiO_3$) powder are coated with electrode layers 2a and 2b, respectively. These electrode layers 2a and 2b are connected to lead wires 3a and 3b, respectively. Then the entire surface of the body is coated with an insulating material 4, such as epoxy resin.

A contactless starter eqipped with FEC capacitor thus constructed has been put into practical use as a contactless starter for a fluorescent lamp. Recently. attempts have been made to use it in the built-in starter of a high-intensity gas-discharge lamp (hereinafter referred to as an HID lamp) such as a high pressure sodium lamp. As yet, however, such a built-in contactless starter for an HID lamp utilizing FEC capacitors has not been put into practical use.

This may be attributable to the following fact: there are special characteristics required of an FEC capacitor that is to be used in a built-in starter for an HID lamp. First, it must offer a sufficient thermal resistance not to deteriorate or suffer a change in properties when exposed to a high temperature gas within the lamp. Second, it must be able to generate pulses of sufficient amplitude and energy to permit easy and reliable starting of an HID lamp that needs a high starting voltage.

An FEC capacitor of the construction shown in FIG. 1 cannot satisfy the above requirements, so that it cannot be used in a starter for an HID lamp.

In view of this, the inventor of the present invention previously proposed an FEC capacitor construction in Japanese Patent Publication No. 62-60803, which is shown in FIG. 2. In this capacitor, electrode layers 12a and 12b are formed on both sides of a ferroelectric ceramic substrate 11 which is made mainly from barium titanate or a similar material. The entire surface of the substrate 11 is then coated with a mineral glass 13 containing lead oxide and boric oxide as its main constituents, with only the central portions of the electrode layers 12a and 12b left uncoated, and to these central portions 12a and 12b are affixed lead terminals 15a and 15b by means of an electrically conductive adhesive 14a, 14b.

In the above-described capacitor construction, silver paste is employed for forming the electrode layers 12a and 12b. For the electrically conductive adhesive 14a, 14b for affixing the lead terminals 15a and 15b to the electrode layers 12a and 12b, a paste mixture is used which consists of silver powder and a low-melting-point glass powder containing lead oxide (PbO) and boric oxide ($B_2O_3$) as its main constituents.

A mineral glass which offers thermal resistance as the coating material prevents the capacitor thus constructed from deteriorating in a high-temperature gas. It has been found, however, that there is still room for improvement in the amplitude and energy of the pulse.

The difficulty of generating pulses of sufficient amplitude and energy may be attributable to the following circumstances: when an FEC capacitor is applied to a contactless starter to generate high-voltage pulses in cooperation with a choke coil type ballast, the FEC capacitor is subjected to mechanical oscillation due to electrostriction caused by the high-voltage pulses generated. In the case of a disc type FEC capacitor, the oscillation takes place in the radial and thickness directions, as shown in FIGS. 3A and 3B. The greater the amplitude of this oscillation without being restrained by external factors, the higher the voltage of the high-voltage pulses generated. In the case of an FEC nonlinear capacitor of the above-described construction, such mechanical oscillations due to electrostriction may be restrained because of the fact that the entire surface of the element is coated with a mineral glass, which will interfere with improvement in the amplitude and energy of the pulses.

It has also been found that in a nonlinear capacitor of the above-described construction, the electrically conductive adhesive 14a, 14b is dispersed through the electrode layers 12a and 12b over the grain boundary of the ferroelectric ceramic substrate 11, exerting an undesirable influence on the capacitor characteristics. In the first place, this causes a general decrease in the value of the high-voltage pulses generated. This phenomenon is attributable to the intrusion of impurities into the ferroelectric ceramic substrate. Furthermore, the stresses due to the mechanical oscillation of the ferroelectric ceramic substrate caused by electrostriction during high-voltage pulse generation may cause a fracture in the ferroelectric ceramic substrate itself at the grain boundaries where such an adhesive dispersion has taken place.

SUMMARY OF THE INVENTION

In view of the above-described limitations in prior art nonlinear capacitors on generating high-voltage pulses, it is an object of this invention to provide a nonlinear capacitor for generating high-voltage pulses that have sufficient amplitude and energy.

Another object of this invention is to provide a nonlinear capacitor for generating high-voltage pulses, which is capable not only of generating pulses of sufficient amplitude and energy but also of preventing fractures of the ferroelectric ceramic substrate.

A further object of this invention is to provide a nonlinear capacitor for generating high-voltage pulses with better characteristics by controlling the position of the connector portions with respect to the electrode layers provided on the ferromagnetic ceramic substrate.

In order to achieve the above objects, a nonlinear capacitor for generating high-voltage pulses in accordance with this invention comprises a ferroelectric ceramic substrate, electrode layers formed on both sides of said substrate, a mineral glass coating covering the entire surface of the capacitor except for the connector portions for said electrode layers and for the outer peripheral surface of said ferroelectric ceramic substrate, and lead terminals electrically connected to the electrode layers through said connector portions.

In a nonlinear capacitor for generating high-voltage pulses thus constructed, no mineral glass coating is provided on the outer peripheral surface of the ferroelectric ceramic substrate, so that the mechanical oscillation due to electrostriction is not restrained in this region, thus making it possible to generate high-voltage pulses of sufficient amplitude and energy.

Furthermore, a nonlinear capacitor in accordance with this invention comprises a ferroelectric ceramic substrate, electrode layers formed on both surfaces of said substrate, a mineral glass coating covering the entire surface of the capacitor except for the connector portions for said electrode layers and for the outer peripheral surface of said ferroelectric ceramic substrate, electrically conductive layers covering the connector portions and the portions corresponding to the positions at which lead terminals which are not in line with said connector portions are connected, and lead terminals connected to said electrically conductive layers at said positions by means of an electrically conductive adhesive.

In a nonlinear capacitor for generating high-voltage pulses of the above described construction, the mineral glass coating completely prevents the electrically conductive adhesive for affixing the lead terminals from being dispersed into the ceramic substrate. Thus, any decrease in the voltage of the pulses generated and damage to the ceramic substrate are avoided.

DETAILED DESCRIPTION OF THE PREFERRED EMBODIMENT

Figure 4A:
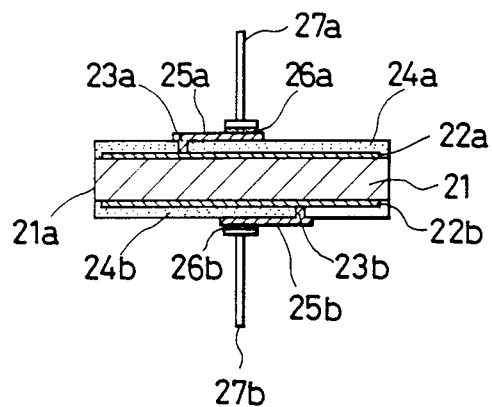
FIGS. 4A and 4B are a sectional view and a plan view, respectively, of the first embodiment of this invention.
Figure 4B:
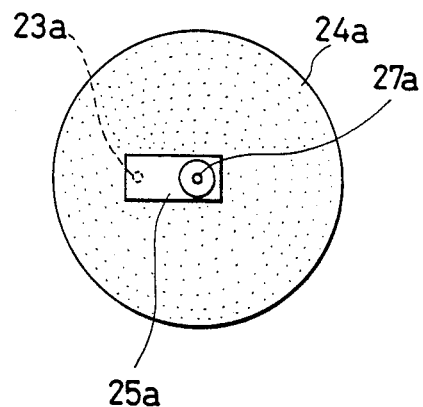

An embodiment of this invention will now be explained. FIG. 4A is a sectional view of a nonlinear capacitor for generating high-voltage pulses in accordance with this invention, and FIG. 4B is a plan view thereof. As shown in these drawings, on both sides of a ferroelectric ceramic substrate 21 are formed electrode layers 22a and 22b. The respective surfaces of these electrode layers 22a and 22b are covered with mineral glass coatings 24a and 24b except for connector portions 23a and 23b for the electrode layers 22a and 22b.

No mineral glass coating is provided on the outer peripheral surface of the ferroelectric ceramic substrate 21, leaving the surface exposed.

Next, on the respective outer surfaces of the mineral glass coatings 24a and 24b are formed electrically conductive layers 25a and 25b which are connected to the connector portions 23a and 23b. To these electrically conductive layers 25a and 25b are affixed lead terminals 27a and 27b by means of an electrically conductive adhesive shown at 26a and 26b.

In this embodiment, the lead terminals 27a and 27b are fixed approximately in the center of the ferroelectric ceramic substrate 21, whereas the connector portions 23a and 23b for the electrode layers 22a and 22b are situated at positions removed from the center of the ceramic substrate 21.

Since in this construction no glass coating is provided on the outer peripheral surface 21a of the ceramic substrate 21, the mechanical oscillation due to electrostriction is not restrained, so that high-voltage pulses of great amplitude and energy can be generated. Furthermore, it is impossible for the electrically conductive adhesive shown at 26a and 26b to be dispersed through the mineral glass coatings 24a and 24b and the electrode layers 22a and 22b into the ceramic substrate 21. This effectively avoids a decrease in the voltage of the generated pulses as well as fractures of the ceramic substrate 21.

If the outer peripheral surface 21a of the ceramic substrate 21 is not covered with a glass coating, no deterioration in the characteristics due to oxidation or the like can occur since it is used in a built-in contactless starter of a lamp, i.e., it is exposed only to a vacuum or to an inert gas.

Furthermore, adequate thermal protection of the ceramic substrate 21 is provided by the mineral glass coating provided on both sides of the ceramic substrate 21, i.e., over most of the surface area thereof, so that if no glass coating is provided on the outer peripheral surface 21a of the ceramic substrate 21, i.e., the surface with a relatively small area, there is practically no danger of the ceramic substrate 21 being damaged for that reason.

Next, a specific example will be given of a method of producing such a nonlinear capacitor.

First, to barium carbonate ($BaCO_3$) are added titanium dioxide ($TiO_2$) and a mole fraction of several percent of zirconium oxide ($ZrO_2$) as well as traces of rare earth metal oxides. To the powder thus obtained is added some pure water and a binder (polyvinyl alcohol). The mixture thus obtained is spray-dried and then calcined at 1100° C. for two hours. Pure water and a binder (polyvinyl alcohol) are added to the calcined substance and it is pulverized. The mixture thus obtained is spray-dried and pressed into a discoid shape. After that, it is calcined in the air at 1400° C. for six hours, to provide a ferroelectric ceramic substrate 21 with a diameter of 19.3 mm and a thickness of 0.65 mm.

Both sides of the substrate 21 are given a coating of silver paste with a diameter of 18 mm by screen printing. The coated substrate is then dried and baked in the air at 900° C. to form electrode layers 22a and 22b. After that, the surfaces of the electrode layers 22a and 22b are covered with mineral glass coatings 24a and 24b respectively except for the connector portions 23a and 23b for the electrode layers. A suitable material for the mineral glass coating is, for example, Dielectric Paste 8289 by Dupont. After applying this glass material in the proper places on the surfaces of the electrode layers, the substrate 21 is baked to apply the mineral glass coatings 24a and 24b of ferroelectric crystallized glass.

Next, electrically conductive layers, for example, silver layers 25a and 25b, are formed on the outer surfaces of the mineral glass coatings 24a and 24b in order to electrically connect arbitrary portions on said outer surfaces, for example, the central portions thereon with the connector portions 23a and 23b for the electrode layers 22a and 22b. Last, to arbitrary positions on said silver layers 25a and 25b, except for those corresponding to said connector portions 23a and 23b, are affixed lead terminals 27a and 27b by means of an adhesive paste 26a, 26b consisting of a low-melting-point glass powder and silver powder. Then, by baking the substrate thus modified in the air at 600° C., a capacitor for generating high-voltage pulses is completed.

A suitable low-melting-point glass, which is one of the ingredients of the adhesive paste, i.e., the electrically conductive adhesive 26a, 26b for affixing the lead terminals 27a and 27b to the silver layers 25a and 25b, containing lead oxide (PbO) and boric oxide ($B_2O_3$) as its main constituents, especially one in which lead oxide (PbO) and boric oxide ($B_2O_3$) are mixed with silicon oxide ($SiO_2$), may be employed.

In this embodiment, the lead terminals 27a and 27b are made of nickel; their plate-like portions affixed to the electrically conductive layers 25a and 25b have a thickness of 0.3 mm and a diameter of 1 to 5 mm, and their bar-like portions extending vertically from the plate-like portions have a diameter of 0.5 mm. As the material for the lead terminals, an iron-nickel alloy or an iron-nickel-cobalt alloy may also be employed.

While in this embodiment the lead terminals are affixed to the electrically conductive layers by means of an electrically conductive adhesive, they can also be affixed to the mineral glass coatings by means of an electrically conductive adhesive, the connector portions and the electrically conductive adhesive being connected with each other through the electrically conductive layers.

Figure 1:
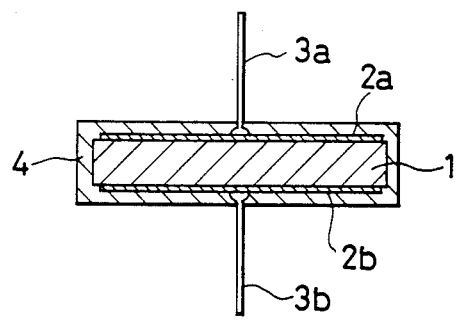
FIG. 1 is a sectional view showing an example of the prior art ferroelectric ceramic capacitor construction.
Figure 2:
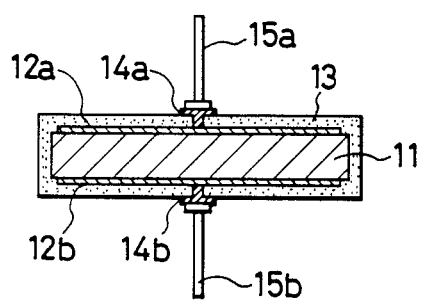
FIG. 2 is a sectional view showing the capacitor construction for generating high voltage pulses which was previously proposed, by the inventor of the present invention.
Figure 3A:
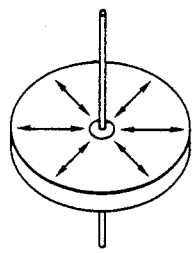
FIGS. 3A and 3B are schematic views showing the oscillation modes in a ferroelectric ceramic capacitor due to electrostriction.
Figure 3B:
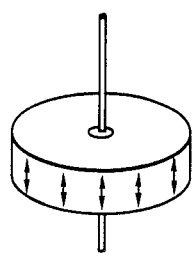
Figure 5:
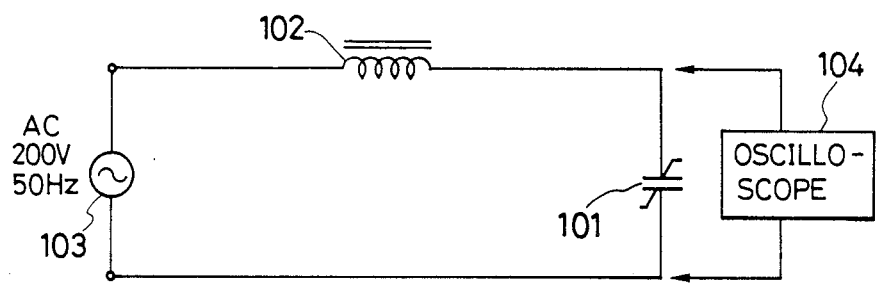
FIG. 5 is a schematic view showing a test circuit for the high voltage pulse generation.
Figure 6:
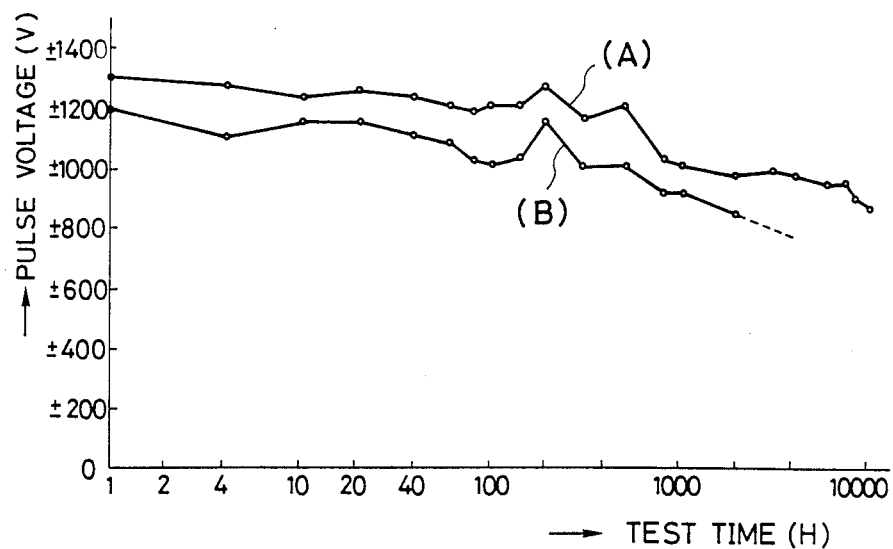
FIG. 6 is a diagram showing the relation between the voltage of the pulses generated and the test time in the first embodiment of this invention and in the prior art.

A capacitor 101 for generating high-voltage pulses with the above-described construction was connected, as shown in FIG. 5, to an AC power source 103 with the intermediary of a induction element 102 (a choking coil type ballast for 125 W discharge lamps). The capacitor 101 was then held in Freon liquid and an input voltage at AC 200 V, 50 Hz was applied thereto to conduct a high-voltage pulse generation test for 10000 hours, the result of which is shown by the curve A in FIG. 6. The curve B in FIG. 6 corresponds to the result obtained by testing the conventional capacitor shown in FIG. 2 under the same conditions. The voltage of the pulses generated was measured by means of an oscilloscope 104. As will be appreciated from FIG. 6, the capacitor for generating high-voltage pulses in accordance with this invention was able to provide a higher pulse voltage than the conventional one throughout the test. Furthermore, while the ferroelectric ceramic substrate of the conventional capacitor fractured after 2000 hours of testing, the one in accordance with this invention was still intact after 10000 hours.

In mounting lead terminals 27a and 27b onto the nonlinear capacitor with the above-described construction with the intermediary of the electrically conductive layers 25a and 25b, these electrically conductive layers and the connector portions must be so arranged that the mechanical oscillation of the nonlinear capacitor due to electrostriction is not affected. Otherwise, the voltage value of the high-voltage pulses generated may decrease.

More specifically, when the lead terminals 27a and 27b are mounted onto the positions corresponding to the center of the ceramic substrate 21, arranging the connector portions 23a and 23b at positions considerably remote from the center will result in a considerably greater width of the electrically conductive layers 25a and 25b. Such a great width of the electrically conductive layers 25a and 25b may restrain the mechanical oscillation due to electrostriction and decrease the voltage of the pulses generated.

In view of this, the inventors of the present invention prepared nonlinear capacitors with a construction similar to that shown in FIGS. 4A and 4B, using ferroelectric ceramic capacitors of different sizes and changing, for each size, the positions of the connector portions. Then the pulse voltage of the capacitor thus prepared was measured, using the pulse generation testing circuit shown in FIG. 5. The result of the measurement is shown in FIG. 7.

Figure 7:
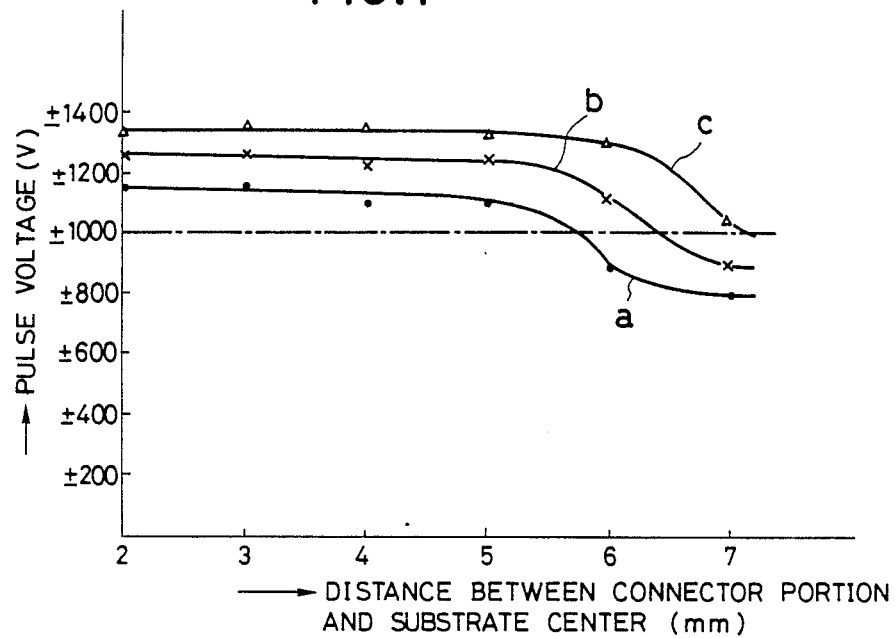
FIG. 7 is a diagram showing the changes in the voltage of the pulses generated caused by changing the position of the connector portion.

The curve a in FIG. 7 represents the changes in the voltage value of the pulses generated when the position of the connector portions was changed in a nonlinear capacitor using a ceramic substrate with a diameter of 15.5 mm, a thickness of 0.65 mm and an electrode layer diameter of 14.5 mm. The curve b represents the results of a similar test for a ceramic substrate with a diameter of 17.6 mm, a thickness of 0.65 mm and an electrode layer diameter of 16.5 mm, and the curve c represents the results for a ceramic substrate with a diameter of 19.3 mm, a thickness of 0.65 mm and an electrode layer diameter of 18.0 mm.

As can be appreciated from FIG. 7, in the capacitor using a ceramic substrate with a diameter of 15.5 mm and a thickness of 0.65 mm, the pulse voltage is about constant and higher than the normal voltage of 1000 V when the connector portions are situated within 5 mm from the center. However, when the connector portions are situated in positions at a distance of 6 mm or more from the center, the voltage of the pulses generated decreases rapidly, failing to reach the normal value of 1000 V.

One may conclude from this that, in the case of a ceramic substrate of this size, the connector portions must be situated within 5 mm of the center. 5 mm corresponds to ca. 65% of the substrate radius. The same tendency is to be observed in the other capacitors with different ceramic substrates; the curves b and c indicate the same tendency, i.e. a constant voltage higher than the normal value is generated when the the connector portions are situated within ca. 65% of the substrate radius from the center.

These results show that the connector portions are to be arranged at positions within 65% of the substrate radius from the center. This restricts the size of the electrically conductive layers, so that the mechanical oscillation due to electrostriction is not restrained, thereby preventing the voltage value of the pulses generated from decreasing.

In the embodiment shown in FIGS. 4A and 4B, the electrically conductive layers 25a and 25b provided on the mineral glass coatings 24a and 24b must be formed in the proper positions where they cover the connector portions 23a and 23b for the electrode layers 22a and 22b which are usually remote from the center, so that the electrode layers 22a and 22b may be electrically connected to the lead terminals 27a and 27b.

In this type of capacitor for generating high-voltage pulses, the substrate is formed as a thin disc, a form which admits of no orientation, so that positioning it is by no means easy. Consequently, it is difficult to form the electrically conductive layers 25a and 25b by printing etc. in positions where they cover the connector portions 23a and 23b. This is especially the case when a plurality of ceramic substrates are to be provided with electrically conductive layers by printing etc. at one time since it is necessary then to set the connector portions of the substrates in the same direction, which involves a very complicated operation, at times leading to imperfect connection between the electrode layers and the lead terminals.

Figure 8A:
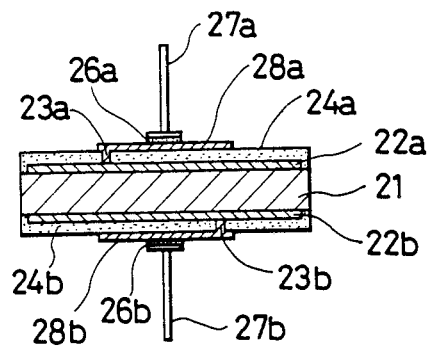
FIGS. 8A and 8B are a sectional view and a plan view, respectively, of the second embodiment of this invention.
Figure 8B:
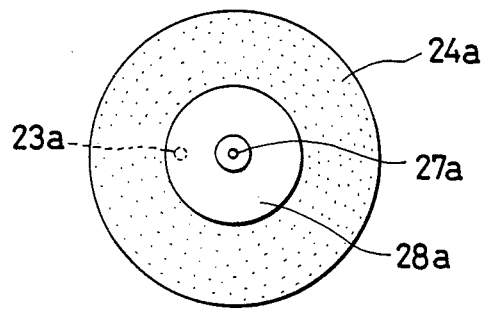

FIGS. 8A and 8B are a sectional view and a plan view, respectively, of the second embodiment of this invention in which the above problem has been overcome. In these drawings, components having identical counterparts in the first embodiments are referred to with the same referrence numbers. On both sides of a discoid ferroelectric ceramic substrate 21, which is made mainly from barium titanate, are formed electrode layers 22a and 22b by applying silver paste thereto and baking the substrate. The outer surfaces of the electrode layers 22a and 22b are covered with ferroelectric crystallized glass coatings 24a and 24b except for connector portions 23a and 23b for the electrode layers 22a and 22b. Since the lead terminals are attached to the central portions of the ceramic substrate 21, the connector portions 23a and 23b are situated in positions which are not in line with the center.

On the outer surfaces of the glass coatings 24a and 24b are formed, concentrically with the ceramic substrate 21, circular electrically conductive layers 28a and 28b consisting, for example, of silver layers, in such a manner that they cover the connector portions 23a and 23b for the electrode layers 22a and 22b. To the outer surfaces of the electrically conductive layers 28a and 28b, at positions other than those which correspond to the connector portions 23a and 23b, which in this embodiment lie in the center of the substrate 21, are affixed lead terminals 27a and 27b, made, for example, of nickel by means of an electrically conductive adhesive 26a, 26b, which consists of a low-melting-point glass powder and silver powder.

The formation of the electrically conductive layers 28a and 28b as circular layers concentric with the ceramic substrate 21 obviates the positioning of the ceramic substrate 21 with respect to the positions of the connector portions 23a and 23b. The electrically conductive layers 28a and 28b can be easily formed, irrespectively of the positions of the connector portions 23a and 23b, so that imperfect connection can be avoided completely.

While in the above described two embodiments the lead terminals are attached to the center of the ceramic substrate, they can be fixed to the capacitor at any desired position except for those corresponding to the connector portions, in accordance with the places where the capacitor is mounted.

In the above embodiments a ferroelectric crystallized glass is used as the inorganic coating material, because crystallized glass is hardly ever dispersed in the electrode layer and the electrically conductive layer, which are made of silver, so that it effectively helps to avoid troubles due to dispersion. Furthermore, such a coating of crystallized glass functions s a cushioning material, which decreases oscillation. However, it also decreases the restraining effect of the lead terminals on the oscillation of the ceramic substrate due to electrostriction, even when the lead terminal is fixed to the lamp mount.

Furthermore, the lead terminals in the above embodiments are wire rod made mainly of nickel. They are employed because the lead terminals are to be fixed to the capacitor by means of an electrically conductive adhesive at a temperature of ca. 600° C.; even at this temperature, nickel lead terminals are not easily oxidized. Moreover, they have a desirable wetting property with an electrically conductive adhesive. The fact that they can be easily fixed to the lamp mount by spot welding is another reason for employing them.

Lead terminals made mainly of an alloy of iron and nickel or one of iron, nickel, and cobalt are also being used, since they provide similar effects.

What is claimed is:

1. A nonlinear capacitor for generating high-voltage pulses, comprising a ferroelectric ceramic substrate, electrode layers formed on both sides of said substrate, a mineral glass coating covering the entire surface of the capacitor except for connector portions for said electrode layers and for the outer peripheral surface of said substrate, and lead terminals electrically connected to said electrode layers through said connector portions.

2. A nonlinear capacitor for generating high-voltage pulses according to claim 1, wherein said mineral glass coating is composed of ferroelectric crystallized glass.

3. A nonlinear capacitor for generating high-voltage pulses according to claim 1, wherein said lead terminals are made of a material which consists mainly of nickel, iron and nickel, or iron and nickel and cobalt, as its main constituent(s) and are composed of plate-like portions which are affixed to the capacitor by means of an electrically conductive adhesive and bar-like portions which extend vertically from said plate-like portions.

4. A nonlinear capacitor for generating high-voltage pulses, comprising a ferroelectric ceramic substrate, electrode layers formed on both sides of said substrate, a mineral glass coating covering the entire surface of the capacitor except for connector portions for said electrode layers and for the outer peripheral surface of said substrate, electrically conductive layers formed on the outer surfaces of said mineral glass coating in such a manner that they cover said connector portions and the portions corresponding to the positions for connecting lead terminals which are not in line with said connector portions, and lead terminals connected to said electrically conductive layers at said positions for connecting lead terminals by means of an electrically conductive adhesive.

5. A nonlinear capacitor for generating high-voltage pulses according to claim 4, wherein said lead terminals are attached to the capacitor at positions corresponding to the center of the ceramic substrate.

6. A nonlinear capacitor for generating high-voltage pulses according to claim 3, wherein said connector portions for said electrode layers are arranged at positions within 65% of the radius of said ceramic substrate from the center.

7. A nonlinear capacitor for generating high-voltage pulses according to claim 6, wherein said electrically conductive layers are of a rectangular configuration.

8. A nonlinear capacitor for generating high-voltage pulses according to claim 6, wherein said electrically conductive layers are formed as circular layers with their centers at the center of the ceramic substrate.

9. A nonlinear capacitor for generating high-voltage pulses according to claim 5, wherein said electrically conductive layers are of a rectangular configuration.

10. A nonlinear capacitor for generating high-voltage pulses according to claim 5, wherein said electrically conductive layers are formed as circular layers with their centers at the center of the ceramic substrate.

11. A nonlinear capacitor for generating high-voltage pulses according to claim 5, wherein said lead terminals are made of a material which consists mainly of nickel, iron and nickel, or iron and nickel and cobalt, as its main constituent(s) and are composed of plate-like portions which are affixed to the capacitor by means of an electrically conductive adhesive and bar-like portions which extend vertically from said plate-like portions.

12. A nonlinear capacitor for generating high-voltage pulses according to claim 4, wherein said electrically conductive layers are of a rectangular configuration.

13. A nonlinear capacitor for generating high-voltage pulses according to claim 4, wherein said mineral glass coating is composed of ferroelectric crystallized glass.

14. A nonlinear capacitor for generating high-voltage pulses according to claim 4, wherein said electrically conductive adhesive is a paste mixture consisting of silver powder and a low-melting-point glass powder containing lead oxide and boric oxide as its main constituents.

15. A nonlinear capacitor for generating high-voltage pulses according to claim 4, wherein said lead terminals are made of a material which consists mainly of nickel, iron and nickel, or iron and nickel and cobalt, as its main constituent(s) and are composed of plate-like portions which are affixed to the capacitor by means of an electrically conductive adhesive and bar-like portions which extend vertically from said plate-like portions.

* * * * *